United States Patent [19]

Kamimura et al.

[11] Patent Number: 4,769,278

[45] Date of Patent: Sep. 6, 1988

[54] RESILIENT MULTI LAYERED MEMBER INCORPORATING SKIN LAYER, FOAM LAYER CUSHION LAYER AND CORE, AND METHOD OF MANUFACTURE THEREOF

[75] Inventors: Tomohisa Kamimura, Samukawa; Noriyoshi Suzuki, Chigasaki; Takashi Imaizumi, Samukawa, all of Japan

[73] Assignee: Kasai Kogyo Co., Ltd., Tokyo, Japan

[21] Appl. No.: 63,403

[22] Filed: Jun. 18, 1987

[30] Foreign Application Priority Data

Sep. 29, 1986 [JP] Japan .................................. 61-230779

[51] Int. Cl.$^4$ .................. B32B 1/00; B32B 1/10; B32B 3/26; B32B 7/12
[52] U.S. Cl. ...................................... 428/282; 156/228; 156/245; 428/159; 428/174; 428/316.6; 428/317.1; 428/319.7
[58] Field of Search ............... 428/159, 174, 280, 282, 428/316.6, 317.1, 319.3, 319.7; 156/228, 245

[56] References Cited

U.S. PATENT DOCUMENTS 4,476,183 10/1984 Holtrop et al. .................. 428/316.6
4,504,536 3/1985 Wong .............................. 428/316.6
4,510,201 4/1985 Takeuchi et al. ............... 428/316.6

*Primary Examiner*—William J. Van Balen
*Attorney, Agent, or Firm*—Wegner & Bretschneider

[57] ABSTRACT

In this resilient multi layered member, there are provided as laminated together: a surface skin layer, formed of PVC resin powder made into a gel, on the outside side of the resilient multi layered member; a foam material layer, formed from foamed PVC resin powder, the outer side of which is adhered to the inner side of the surface skin layer; a cushion material layer, the outer side of which is adhered to the inner side of the foam material layer; and a substantially stiff core material layer, the outer side of which is adhered to the inner side of the cushion material layer, on the inside side of the resilient multi layered member. There may be further included an adhesive layer by means of which the outer side of the cushion material layer is adhered to the inner side of the foam material layer. The cushion material layer may be formed from urethane foam, or from non woven fabric, which may be a felt material, and may have a density greater than about 200 grams per square meter. This density may more particularly be between about 260 grams per square meter and about 300 grams per square meter. Alternatively, the cushion material layer may be formed from compressed urethane material, which may be compressed by a factor of from about 50% to about 80%, and may have a density of between about 0.05 grams per cubic centimeter and about 0.10 grams per cubic centimeter.

20 Claims, 3 Drawing Sheets

RESILIENT MULTI LAYERED MEMBER INCORPORATING SKIN LAYER, FOAM LAYER CUSHION LAYER AND CORE, AND METHOD OF MANUFACTURE THEREOF

BACKGROUND OF THE INVENTION

The present invention relates to a multi layered member, more particularly to a resilient such multi layered member, and to a method of manufacture thereof, and particularly may be applied to an automotive interior member such as a door trim, a padded instrument panel, or the like. Even more particularly, the present invention relates to such a resilient multi layered member, which particularly incorporates a cushion layer for the purpose of improving its various characteristics such as its external appearance, its feel to the user, and its thickness and durability, and to a method of manufacture thereof.

In the prior art, there have been proposed various types of resilient multi layered members, such as are utilized in automotive applications as door trims, padded instrument panels, and the like. Such resilient multi layered members are required to have a favorable external appearance and feel, as well as having uniform thickness which does not change over time. Such resilient multi layered members have typically been formed by the so called slush molding process. Particularly, in Japanese Patent Laying Open Publication Ser. No. 58-32720 (1983), which it is not hereby intended to admit as prior art to the present patent application except to the extent in any case mandated by applicable law, there are disclosed a resilient multi layered member and a method for making it, which will now be explained with regard to FIG. 5 of the appended drawings, which is a pair of transverse cross sectional views showing such a slush molding process.

Referring to FIG. 5 first a layer of non foaming sol material is laid onto and adhered onto the internal surface of a metallic mold 1, which is formed in the desired external shape of the member which is to manufactured—this metallic mold 1 will be termed the outer mold henceforward in this specification. This may be done by layering PVC (polyvinyl chloride) powder against the internal surface of said outer mold 1, for example. This layer of non foaming sol material is then made into a gel, for example by heating it up, so as to form a surface skin layer 2 over the internal surface of the outer mold 1. Then a plastic sol material is mixed with a foaming agent and is laid as a gel over the upper surface of this surface skin layer 2 as it lies in the outer mold 1, so as to form a foam layer 3. And then, while this foam layer 3 is still soft, a core layer 4, which is relatively stiff and typically may be made in advance from a molded resin material or a composite molded resin material by a per se known process, and which is formed into a shape complementary to the shape of the outer mold 1, is set onto and against the foam layer 3, so that said foam layer 3 and said core layer 4 join together into an integral body. The whole layered mass then is allowed to cool, and then is removed from the outer mold 1 to constitute a multi layered member, which is resilient due to the presence of the foam layer 3 between the surface skin layer 2 and the core layer 4. This resilient multi layered member may be used as an automotive interior member such as a door trim panel or a dash board panel, for example.

However, this process is subject to a number of problems.

First, it is difficult to form evenly the layer of PVC resin powder on the internal surface of the outer mold 1 in order to form the surface skin layer 2, because the temperature distribution on said internal surface of said outer mold 1 may well be rather uneven.

Second, it is difficult to control adequately the thickness of the foam layer 3, and it is likely that pockets of air will be included between said foam layer 3 and the core layer 4 which is adhered thereagainst. Such pockets of air are schematically shown in the lower portion of FIG. 5.

Third, since the core layer 4 is necessarily placed over the foam layer 3 while said foam layer 3 is still soft in order to secure good adhesion of said core layer 4 to said foam layer 3, certain quantities of gas are necessarily still being evolved from said foam layer 3 due to the chemical foaming reaction therein which is still proceeding to a certain extent, and these quantities of gas are responsible for the generation of gas pockets between said foam layer 3 and said core layer 4, also schematically shown in the lower portion of FIG. 5.

For all these reasons, it is hard to maintain a constant thickness for the finished products. Further, the irregular pockets of air and gas between the foam layer 3 and the core layer 4 tends to produce irregularities in the surface of the surface skin layer 2, which deteriorates the appearance of the finished products. And, further, the feel of said finished products when touched by a user thereof is rendered uneven and disagreeable by the presence of said irregular pockets of air and gas. And the possible collapse, during use of the resilient multi layered member, of such irregular pockets of air and gas, can cause the thickness of the resilient multi layered member to vary after its manufacture and during its period of use.

SUMMARY OF THE INVENTION

Accordingly, there has become evident a requirement for an improved resilient multi layered member, and an improved method of manufacture thereof. This problem has exercised the ingenuity of the inventors of the present invention.

One concept that might be considered, referring again to the FIG. 5 illustration, would be to form the core layer 4 by pouring hard urethane resin material in liquid form into the outer mold 1 after the foam layer 3 and the surface skin layer 2 had been laid therein. This concept would indeed be effective for providing good bonding between the core layer 4 and the foam layer 3, and for providing good external appearance and good user feel characteristics, but the problem is entailed thereby that the mechanical strength of a core layer made of such hard urethane resin material tends to be inadequate in many applications. Accordingly, such a hard urethane resin material core layer would typically be required to be rather thick walled in order to enhance its mechanical strength. Further, various difficulties might be encountered during the pouring of the liquid hard urethane resin material into the outer mold 1, if the shape of said outer mold 1 was overly convoluted, and accordingly the fabrication of resilient multi layered members with certain desired shapes might be very troublesome. Yet further, large scale production facilities and relatively expensive equipment would be required for pouring liquid hard urethane resin material into such outer dies. This would entail high investment cost and high manufacturing cost.

Thus, it is the primary object of the present invention to provide a resilient multi layered member, and a method of making the same, which avoid the various problems detailed above.

It is a further object of the present invention to provide such a resilient multi layered member, which has a good external appearance, and further to provide a method of making the same.

It is a further object of the present invention to provide such a resilient multi layered member, which has a good user feel characteristic, and further to provide a method of making the same.

It is a further object of the present invention to provide such a resilient multi layered member, which has uniform thickness, and further to provide a method of making the same.

It is a further object of the present invention to provide such a resilient multi layered member, which can be easily formed in a wide variety of desired shapes, and further to provide a method of making the same.

It is a further object of the present invention to provide such a resilient multi layered member, which has a thickness which does not vary over a long time period of use, and further to provide a method of making the same.

It is a further object of the present invention to provide such a resilient multi layered member, which has a great freedom of being configured in various desired shapes, and further to provide a method of making the same.

It is a further object of the present invention to provide such a resilient multi layered member, which has good mechanical strength, and further to provide a method of making the same.

It is a further object of the present invention to provide such a resilient multi layered member, which is relatively thin walled, and further to provide a method of making the same.

It is a further object of the present invention to provide such a resilient multi layered member, which is relatively light in weight, and further to provide a method of making the same.

It is a further object of the present invention to provide such a resilient multi layered member, the manufacture of which does not require any overly elaborate and expensive production facilities, and further to provide a method of making the same.

It is a further object of the present invention to provide such a resilient multi layered member, the manufacture of which does not require an overly high investment cost, and further to provide a method of making the same.

It is a further object of the present invention to provide such a resilient multi layered member, which is low in manufacturing cost, and further to provide a method of making the same.

It is a yet further object of the present invention to provide such a resilient multi layered member, which is strong and sturdy, and a method of making the same.

It is a yet further object of the present invention to provide such a resilient multi layered member, which is particularly suitable for use in a high temperature environment, and a method of making the same.

It is a yet further object of the present invention to provide such a resilient multi layered member, which is durable, and a method of making the same.

It is a yet further object of the present invention to provide such a resilient multi layered member, which is not particularly subject to deterioration of any bonding layer thereof, and a method of making the same.

It is a yet further object of the present invention to provide such a resilient multi layered member, which is not particularly liable to cracking of any elements thereof, and a method of making the same.

It is a yet further object of the present invention to provide such a resilient multi layered member, which is not particularly subject to any bottoming feel when it is pressed relatively hard during use, and a method of making the same.

It is a yet further object of the present invention to provide such a resilient multi layered member, which provides a favorable buffering action when pressed during use, and a method of making the same.

According to the most general aspect of the present invention, these and other objects are attained by a resilient multi layered member, comprising: a surface skin layer, formed of PVC resin powder made into a gel, on its outside side; a foam material layer, formed from foamed PVC resin powder, the outer side of which is adhered to the inner side of said surface skin layer; a cushion material layer, the outer side of which is adhered to the inner side of said foam material layer; and a substantially stiff core material layer on its inside side, the outer side of which is adhered to the inner side of said cushion material layer.

According to such a resilient multi layered member as specified above, since said cushion material layer is made of a cushion material, which optionally may be a urethane foam material or a non woven fabric material such as a felt material, and since this cushion material layer is laminated between the core material layer and the foam material layer, thereby the elasticity of this cushion material layer accommodates and absorbs any unevennesses in the thickness of the foam material layer, such as caused trouble in the prior art detailed above. And, further, any voids caused upon or in said foam material layer, such as for example caused by trapping of air or of residual gases due to the foaming process, are effectively absorbed by such elastic action of the cushion material layer, so that the surface of the final product, i.e. the surface of the surface skin layer thereof, is free from irregularities, and has a good feeling to the user and a good visual appearance, and further the uniformity of the thickness of the finished resilient multi layered member is very good. Also, there is no risk that, over time, the thickness of any portions of said resilient multi layered member might alter, so its durability is high. This result is attained without the requirement for any provision for elaborate or expensive apparatus for handling liquid material for forming the core material layer, and hence the operation of this process is relatively simple and economical, accordingly allowing low cost for the final product and low investment cost for establishing plant for practicing the process for forming it. And since no particular limitation is entailed upon the shape of the finished product, this product and process are of very general applicability. And the final product is not particularly limited with regard to its mechanical strength, and further can be made relatively thin walled, as well as being relatively light in weight. Further, since during the practice of the method of the present invention the foam material layer is not subjected to any very severe pressure, as opposed to the case in which the core material layer is made of relatively hard urethane material, this means that the foam material layer is not liable to be damaged by such pressure, and this further enhances the surface of the final product and ensures that it will be free from irregularities and will have a good feeling to the user.

And, according to a particular specialization of the present invention, the above and other objects may more particularly be accomplished by such a resilient multi layered member as specified above, wherein said cushion material layer is formed from compressed urethane material. In this case, as will be detailed later in the present specification, problems of surface irregularities and uneven thickness which might otherwise arise with regard to the finished product, if said cushion material layer were made of non compressed urethane material or the like, due to infiltration of bonding agent or of solvent thereof into the cellular structure of said cushion material layer, are positively avoided, because this compressed urethane material is already compressed to a certain extent, and is thereby endowed with a highly dense cellular structure. Accordingly, such ill effects of the bonding agent are entirely avoided. Further, this compressed urethane foam material, which is greater in mechanical strength than the normal type of urethane foam material, can offer the additional advantages of higher durability, of greater freedom of shaping for the resultant resilient multi layered member, and of a favorable feeling to the user, free from any feeling of bottoming when the resilient multi layered member is pressed. Further, due to its higher elongability, the possiblity of cracking of the cushion material layer is virtually obviated.

BRIEF DESCRIPTION OF THE DRAWINGS

The present invention will now be described with respect to the preferred embodiments of the product and of the method of manufacture thereof, and with reference to the illustrative drawings appended hereto, which however are provided for the purposes of explanation and exemplificatin only, and are not intended to be limitative of the scope of the present invention in any way, since this scope is to be delimited solely by the accompanying claims. With relation to the figures, spatial terms are to be understoood as referring only to the orientation on the drawing paper of the illustrations of the relevant elements, unless otherwise specified; like reference symbols, unless otherwise so specified, denote the same parts and gaps and spaces and so on in the various figures relating to one preferred embodiment, and like parts and gaps and spaces and so on in figures relating to different preferred embodiments; and:

FIG. 2 in its view

DESCRIPTION OF THE PREFERRED EMBODIMENTS

Figure 1:
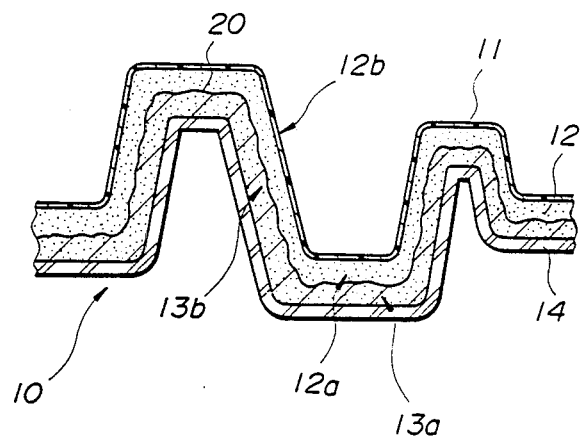
FIG. 1 is a partial transverse sectional view through a preferred embodiment of the multi layered member of the present invention.

The present invention will now be described with reference to the preferred embodiments thereof, and with reference to the figures. The preferred product embodiments of the resilient multi layered member of the present invention differ chiefly with regard to the materials used therein, and accordingly the processes of manufacture of said product embodiments, which constitute the corresponding preferred embodiments of the method of manufacture of a resilient multi layered member of the present invention, are similar with regard to the various steps thereof, and chiefly differ as regards the materials employed. The final product A general view is shown in FIG. 1 of all of the various preferred product embodiments of the resilient multi layered member of the present invention. In this figure, which is a partial transverse cross sectional view, the reference numeral 10 denotes the resilient multi layered member as a whole, and this resilient multi layered member 10 comprises a surface skin layer 11, a foam material layer 12, a cushion material layer 13, and a core material layer 14.

More specifically, first the surface skin layer 11 is formed along the surface of a metallic outer mold for slush molding, which is of course shaped in the desired shape for the finished product and is described hereinafter, by adhering PVC resin powder to the inner surface of said outer mold, and by then converting said PVC resin powder layer into a gel by heating it.

Then, the foam material layer 12 is laminated over this surface skin layer 11 by foaming a mixture of PVC resin powder and an appropriate amount of a foaming agent such as azodicarbonamide or the like by heating it with a heating means, and then by solidifying said foam material layer 12 by cooling it.

Next, the core material layer 14 is formed into the same desired shape for the finished product, by a process of press forming or the like, and the surface thereof adapted to confront the foam material layer 12 is covered with a cushion material layer 13, which may be a slab of urethane foam, or a piece of non woven fabric such as a felt material or the like, and then the core material layer 14 with the cushion material layer 13 formed thereon are abutted against and secured to the surface skin layer 11 with the foam material layer 12 formed thereon, to form the finished product. At this time, due to the elastic action of the cushion material layer 13, any unevennesses in the thickness of the foam material layer 12, and any irregular pockets of air and- /or gas enclosed between said foam material layer 12 and the cushion material layer 13 during the process of securing them together, or generated as after products of the process of foaming the foam material layer 12, are effectively and satisfactorily accommodated.

In other words, as shown in FIG. 1, the foam material layer 12 may in fact be of uneven thickness, having relatively thicker portions such as that denoted as 12a in the figure, and relatively thinner portions such as that denoted as 12b in the figure, but, according to the construction according to the present invention as described above, when the surface skin layer 11 with the foam material layer 12 adhered thereto is laid against the core material layer 14 with the cushion material layer 13 adhered thereto, the portions such as 13a of said cushion material layer 13 corresponding to the relatively thicker portions 12a of said foam material layer 12 are much compressed and their thickness is much reduced, while on the other hand the portions such as 13b of said cushion material layer 13 corresponding to the relatively thinner portions 12b of said foam material layer 12 are not very much compressed and their thickness is not much reduced. And, as a result, the overall thickness of the resilient multi layered member produced is made to be substantially uniform.

Further, if any irregular pockets of air and/or gas should have become enclosed between the foam material layer 12 and the cushion material layer 13, because of the elastic contact between the foam material layer 12 and the cushion material layer 13, these irregularities are absorbed, and the surface of the final product is rendered substantially smooth, without any irregularities, and accordingly the appearance is favorable.

OVERALL MANUFACTURING PROCESS

Figure 2A:
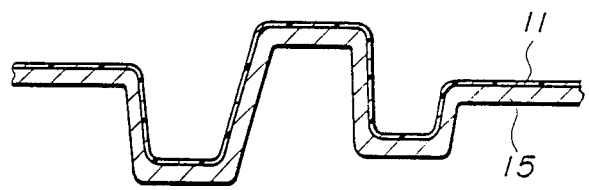
FIG. 2a shows a partial transverse sectional view through an outer mold portion in which a solid surface skin layer has been laid, during the practice of a preferred embodiment of the method for manufacturing a multi layered member of the present invention, and in its view
Figure 2B:
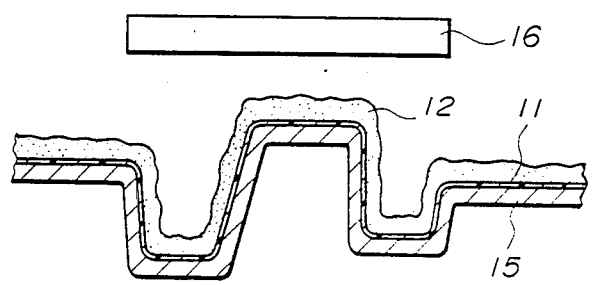
FIG. 2b shows a partial transverse sectional view through said outer mold portion with said solid surface skin layer and with a further foam material layer laid in it, during a process stage of foaming said foam material layer by the use of a heater.
Figure 3:
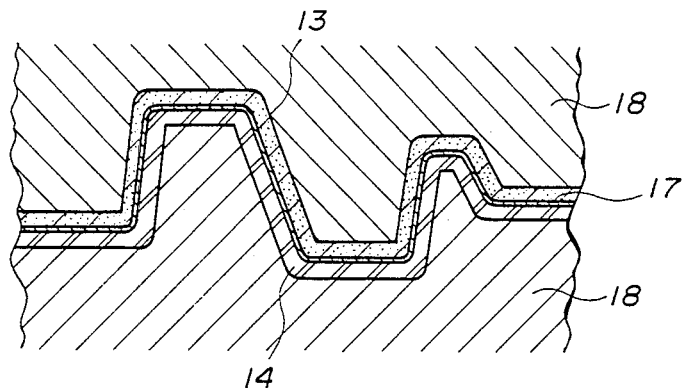
FIG. 3 shows a partial transverse sectional view through a pair of cold press dies, between which a laminated sandwich of a core material sheet layer and a cushion material layer are being press formed, during the practice of said preferred embodiment of the method for manufacturing a multi layered member of the present invention.
Figure 4:
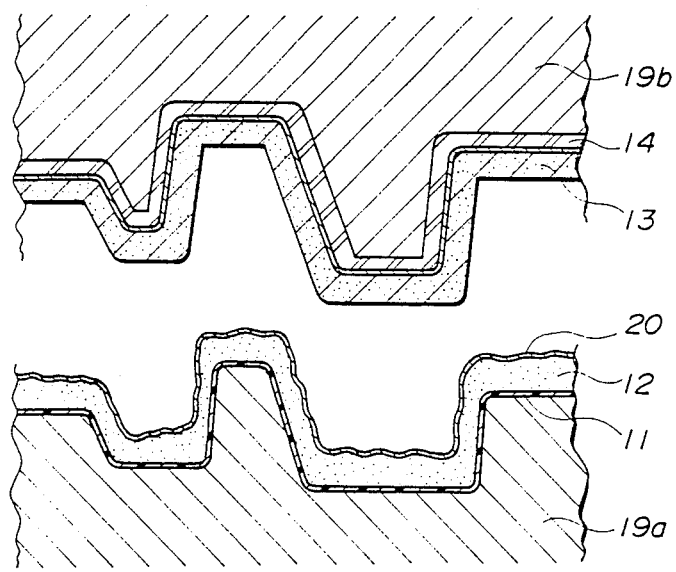
FIG. 4 shows a partial transverse sectional view through two press dies, with said solid surface skin layer and said foam material layer laid on the lower one of said press dies, and with said core material layer and said cushion material layer laid on the upper one of said press dies, during a subsequent stage of the practice of said preferred embodiment of the method for manufacturing a multi layered member of the present invention, in which said four layers are being adhered together.
Figure 5:
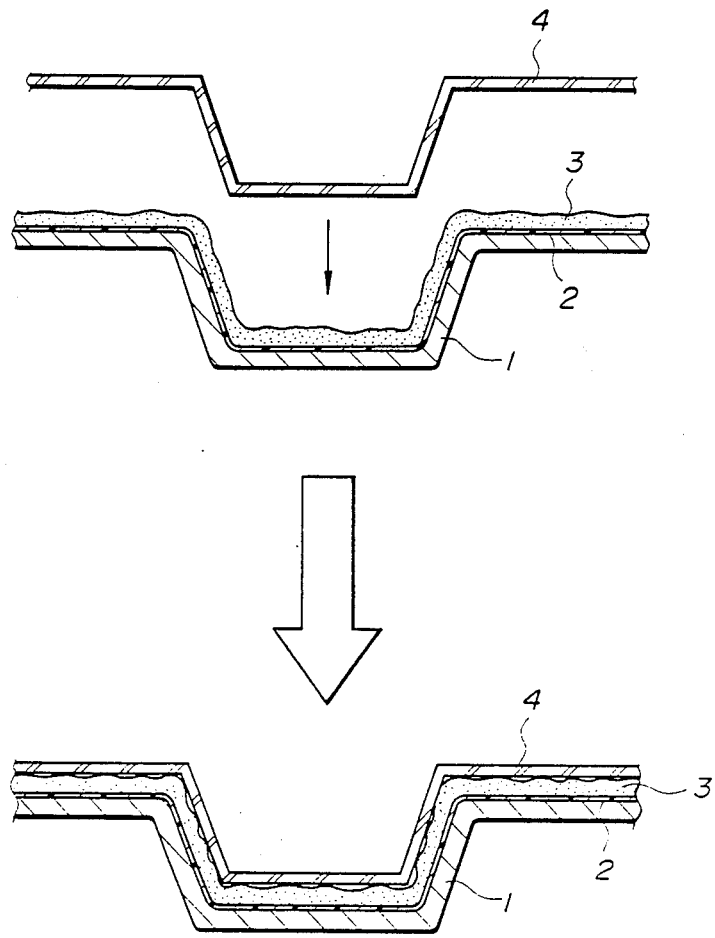
FIG. 5, which relates to the prior art and is similar to FIG. 4, is a pair of partial transverse sectional views through the practice of a prior method for manufacturing a resilient multi layered member.

Referring to FIGS. 2 through 4, the manufacturing process for the various preferred product embodiments of the resilient multi layered member of the present invention will be described. Each of these method embodiments can be divided into three distinct steps: the step of forming the surface skin layer 11 with the foam material layer 12 affixed thereto; the step of forming the core material layer 14 with the cushion material layer 13 affixed thereto; and the step of affixing together these two layered elements.

MAKING THE SURFACE SKIN LAYER 11 WITH THE FOAM MATERIAL LAYER 12 AFFIXED THERETO

First of all, referring to the sectional view shown in FIG. 2a, a quantity of PVC resin powder is procured, and, after heating up a metallic outer mold 15 (which is shaped in the desired shape for the finished product) to a temperature higher than the melting point of said PVC resin powder (230° C. in the case of a typical preferred embodiment of the present invention), said quantity of PVC resin powder is distributed over the inner surface of said metallic outer mold 15. Then, said metallic outer mold 15 is heated, so that the portion of the PVC powder in contact therewith is converted into a gel, thus forming a solid surface skin layer 11 against the inner surface contour of said metallic outer mold 15. And then said metallic outer mold 15 is inverted, so that the excess PVC powder falls away to be recovered. Thus the state of the process illustrated in FIG. 2a is reached.

Next, a further quantity of PVC resin powder is procured, and said PVC powder quantity is mixed with a foaming agent such as azodicarbonamide. And said quantity of PVC resin powder mixed with foaming agent is distributed over the inner surface of the surface skin layer 11 which has been produced as described above and is now layered into the metallic outer mold 15. And then said metallic outer mold 15 and said surface skin layer 11 therein are inverted, so that the excess PVC powder mixed with foaming agent falls away to be recovered. Then, as illustrated in FIG. 2b, the PVC resin powder mixed with foaming agent is heated up by the use of a heater such as the shown radiant heater 16, so that said PVC powder and foaming agent mixture is caused to foam up freely, thus forming a foam material layer 12 in a state of being laminated over the inner surface of the surface skin layer 11. Thus the state of the process illustrated in FIG. 2b is reached.

MAKING THE CORE MATERIAL LAYER 14 WITH THE CUSHION MATERIAL LAYER 13 AFFIXED THERETO

First, for example, a mixture of polypropylene resin and wood powder filler is extruded into a flat sheet 14 by using a T die type extruder or the like, and during this extrusion process a film 17 of a hot melt type bonding agent is laminated over the surface of this sheet 14.

Next, referring to the sectional view shown in FIG. 3, after heating up this core material sheet 14 to a temperature suitable for softening it, a layer 13 of cushion material is layered over the surface of said core material sheet 14 on which the hot melt type bonding agent layer 17 is laminated, and the two layers 13 and 14 together are then press formed by the use of a pair of cold press dies 18 (which are also shaped in the desired shape for the finished product), so as to form the final core material layer 14 with the cushion material layer 13 on the inner side thereof. Thus the state of the process illustrated in FIG. 3 is reached.

In the case of a typical preferred embodiment of the present invention, the material utilized for the cushion material layer 13 may be slab type urethane foam material which has a density of from about 0.02 to 0.03 grams per cubic centimeter, and said cushion material layer 13 may have a thickness of from about three to about seven millimeters.

And, in this typical shown preferred embodiment of the resilient multi layered member and manufacturing method thereof of the present invention, the hot melt type bonding agent layer 17 was laminated over the inner surface of the core material layer 14, in order to promote good adhesion of said core material layer 14 against the cushion material layer 13, because the bonding property of the polyolefin resin material is not particularly good; but this hot melt type bonding agent layer 17 may be omitted if a non polyolefin type resin having a good bonding property is employed as the material for the core material layer 14.

In another preferred embodiment, a non woven fabric material such as a felt material is utilized as the material for the cushion material layer 13. In such a case, the density of this non woven fabric material is desirably greater than about 200 grams per square meter, and more preferably said non woven fabric material will have a density between about 260 grams per square meter and about 300 grams per square meter. These limits are arrived at because, if the density of the non woven fabric material is less than about 200 grams per square meter, then the effectiveness of such a non woven fabric material for absorbing the unevennesses in the thickness of the foam material layer 12 and so on will be insufficient; whereas, on the other hand, if the density of the non woven fabric material is greater than about 300 grams per square meter, then any slight external force could cause a lateral shifting of the fabric, and the integrity of the final product could become lost because the bond because the fibers of the fabric material is weak.

AFFIXING TOGETHER THESE TWO LAYERED ELEMENTS

Basically, the core material layer 14 with the cushion material layer 13 formed thereon is abutted against and is secured to the surface skin layer 11 with the foam material layer 12 formed thereon, to form the finished product, by means of a bonding agent.

Specifically, referring to the sectional view shown in FIG. 4, the surface skin layer 11 with the foam material layer 12 formed thereon are together laid onto a lower one 19a of a pair 19a and 19b of press dies, said press dies 19a and 19b being also shaped in the desired shape for the finished product, with the surface skin layer 11 facing on the downwards side of the combination and resting against said lower press die 19a. And, correspondingly, the core material layer 14 with the cushion material layer 13 formed thereon are together placed over the other upper one 19b of said pair 19a and 19b of press dies, with the cushion material layer 13 facing on the downwards side of the combination and away from said upper press die 19b. And then a bonding agent or adhesive layer 20 is coated over the surface of the foam material layer 12, and then the two ones 19a and 19b of the pair 19a and 19b of press dies are pressed together by a per se known mechanism not shown in the figure, and thereby the foam material layer 12 and the cushion material layer 13 are bonded together by the bonding agent 20, thus integrally bonding together the whole laminated sandwich of the surface skin layer 11, the foam material layer 12, the cushion material layer 13, and the core material layer 14 as lying in the space still remaining between the two ones 19a and 19b of the pair 19a and 19b of press dies.

Thus, since the unevennesses in the thickness of the foam material layer 12 and any voids caused upon or in said foam material layer 12 are effectively absorbed by the elastic action of the cushion material layer 13, the surface of the final product, i.e. the surface of the surface skin layer 11, is free from irregularities, and has a good feeling to the user and a good visual appearance, and further the uniformity of the thickness of the finished resilient multi layered member 10 is very good. Also, there is no risk that, over time, the thickness of any portions of said resilient multi layered member 10 might alter, so its durability is high. This result is attained without the requirement for any provision for elaborate or expensive apparatus for handling liquid material for forming the core material layer 14, and hence the operation of this process is relatively simple and economical, accordingly allowing low cost for the final product and low investment cost for establishing plant for practicing the process for forming it. And since no particular limitation is entailed upon the shape of the finished product, this product and process are of very general applicablity. And the final product is not particularly limited with regard to its mechanical strength, and further can be made relatively thin walled, as well as being relatively light in weight. Further, since during the practice of the method of the present invention the foam material layer 12 is not subjected to any very severe pressure, as opposed to the case in which the core material layer 14 is made of relatively hard urethane material, this means that the foam material layer 12 is not liable to be damaged by such pressure, and this further enhances the surface of the final product and ensures that it will be free from irregularities and will have a good feeling to the user.

FURTHER REFINEMENTS

Now, although the preferred embodiments of the resilient multi layered member of the present invention described above, manufactured according to the preferred embodiments of the method for manufacturing a resilient multi layered member of the present invention described above, are very much better than the products obtained with regard to the prior art, still these products are somewhat wanting in a certain area. Namely, if for example the cushion material layer 13 is made of a slab of urethane foam material, there is a problem that the bonding agent, and in particular the solvent contained therein, tends to infiltrate into said slab of urethane foam material during the bonding process, and this may well cause some of the cells in said slab of urethane foam material to become collapsed and flattened, with the unfavorable result that irregularities may develop upon the surface of the finished product.

Further this bonding agent, if it has thus infiltrated into said slab of urethane foam material during the bonding process and has thus caused some of the cells in said slab of urethane foam material to become collapsed and flattened, subsequently over a period of time may lose some or all of its bonding capability, and particularly this may happen in a high temperature environment. The resulting elastic restoration of the shape of the cells in said slab of urethane foam material could likewise cause the unfavorable result that irregularities might develop upon the surface of the finished product.

Yet further, such a slab of urethane foam material is liable to produce a bottoming effect when it is compressed, as by being pressed by the hand or the finger of a user, and this means that its surface feel to the touch of the user is not quite satisfactory.

Accordingly, in a particular specialized preferred product embodiment of the resilient multi layered member of the present invention and in a corresponding preferred method embodiment, as the material for the cushion material layer 13 there was used a compressed urethane material.

In detail, this compressed urethane material was made by compressing a urethane foam material which was of the thermally compressible type, and was provided with a relatively high density and a relatively great mechanical strength. Particularly, this compressed urethane material was made by thermally compressing a thermally moldable foam 330F(LBL) manufactured by Kurashiki Boseki KK of Osaka, Japan, which had an original thickness of about 6 mm, by a factor of about 50%, so that the resultant material had a thickness of about 3 mm. However, in other possible embodiments the material for this compressed urethane material could be different. This compressed urethane material, however, according to the results of various experimental researches performed by the present inventors which will not particularly be detailed herein in the interests of avoiding prolixity, should preferentially have a density of from about 0.05 grams per cubic centimeter to about 0.10 grams per cubic centimeter, and should preferentially be compressed by a factor of from about 50% to about 80%.

Since the compressed urethane material layer which constitutes the cushion material layer 13 is made by compressing a urethane foam, thus being provided with many highly dense cells, very little of the solvent in the adhesive or bonding agent can penetrate or infiltrate into said compressed urethane material, and hence no substantial surface irregularities in the surface skin layer 11 will be caused, either by collapse of such cells, or by later undesirable shape restoration of previously collapsed such cells. Thereby, the finished appearance of such a preferred embodiment of the resilient multi-layered member of the present invention is enhanced. And no particular bottoming effects are manifested in the compression action of such compressed urethane material, which accordingly enhances the feel to the touch of the user of such a preferred embodiment of the resilient multi layered member of the present invention.

Further, while simple normal high density type urethane material, which typically has a density of about 0.05 grams per cubic centimeter, has a maximum elongability of 180% at the very most, by contrast the compressed urethane foam material used for the cushion material layer 13 of this particular preferred embodiment has a maximum elongability of from 250% to 260%, even though its density is substantially the same as that of such simple normal high density type urethane material. Accordingly, this compressed urethane foam material used for the cushion material layer 13 of this particular preferred embodiment can easily follow complicated and convoluted shapes which may be required for the resilient multi layered member of the present invention, during the process of manufacture thereof, and there is no substantial risk that any substantial cracks will be caused to appear in said cushion material layer 13.

TEST RESULTS

Heat cycle tests were performed upon a resilient multi layered member of the present invention, made as described above by utilizing compressed urethane material as the material for the cushion material layer 13, and similar heat cycle tests were performed upon a similar resilient multi layered member, made by utilizing a normal foam slab urethane material as the material for the cushion material layer 13. It was found that the thickness of the compressed urethane material restored from 2.0 mm to 2.1 mm, while on the other hand the thickness of the normal foam slab urethane material restored from 2.0 mm to 2.6 mm.

One cycle of these heat cycle tests consisted of a period of about four hours at a temperature of about 90° C., followed by a period of about 0.5 hours at a temperature of about room temperature, followed by a period of about 0.5 hours at a temperature of about −40° C., followed by a period of about three hours at a temperature of about 70° C. and at a relative humidity of about 95%, followed by a period of about 0.5 hours at a temperature of about room temperature, followed by a period of about 1.5 hours at a temperature of about about room temperature. And four cycles of these heat cycle tests were performed, in all.

Thus, since the compressed urethane material utilized for the cushion material layer 13 in this particular preferred product embodiment of the resilient multi layered member of the present invention is so dense in its cellular structure that the adhesive agent cannot infiltrate into it, the occurrence of surface irregularities of the surface skin layer 11, and the further development over time of unevennesses in thickness due to reversal of collapse of said cellular structure of said cushion material layer 13, are positively prevented. And, since this compressed urethane material utilized for the cushion material layer 13 in this particular preferred product embodiment of the resilient multi layered member of the present invention is made by compressing high density urethane material, the freedom with regard to choosing the shape of the final resilient multi layered member is improved, and further the feel when pressing said resilient multi layered member is improved by elimination of the bottoming feeling, and a favorable buffering capacity thereof is ensured.

CONCLUSION

Although the present invention has been shown and described in terms of certain of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A resilient multi layered member, comprising:
    a surface skin layer, formed of PVC resin powder made into a gel, on its outside side;
    a foam material layer, formed from foamed PVC resin powder, the outer side of which is adhered to the inner side of said surface skin layer;
    a cushion material layer, the outer side of which is adhered to the inner side of said foam material layer;
    and a substantially stiff core material layer on its inside side, the outer side of which is adhered to the inner side of said cushion material layer.

2. A resilient multi layered member according to claim 1, further comprising an adhesive layer by means of which the outer side of said cushion material layer is adhered to the inner side of said foam material layer.

3. A resilient multi layered member according to claim 1 or claim 2, wherein said cushion material layer is formed from urethane foam.

4. A resilient multi layered member according to claim 1 or claim 2, wherein said cushion material layer is formed from non woven fabric.

5. A resilient multi layered member according to claim 4, wherein said cushion material layer is formed from a felt material.

6. A resilient multi layered member according to claim 4, wherein said cushion material layer has a density greater than about 200 grams per square meter.

7. A resilient multi layered member according to claim 4, wherein said cushion material layer has a density between about 260 grams per square meter and about 300 grams per square meter.

8. A resilient multi layered member according to claim 1 or claim 2, wherein said cushion material layer is formed from compressed urethane material.

9. A resilient multi layered member according to claim 8, wherein said urethane material is compressed by a factor of from about 50% to about 80%.

10. A resilient multi layered member according to claim 8, wherein said cushion material layer has a density of between about 0.05 grams per cubic centimeter and about 0.10 grams per cubic centimeter.

11. A method for manufacturing a resilient multi layered member, comprising the steps of:
  laying a surface skin layer, formed of PVC resin powder made into a gel, into an outer mold portion;
  adhering a foam material layer, formed from foamed PVC resin powder, to the inner side of said surface skin layer, as they lie in said outer mold portion;
  laying a substantially stiff core material layer on an inner mold portion;
  adhering a cushion material layer to the inner side of said core material layer, as they lie in said inner mold portion;
  and approaching together said outer mold portion bearing said surface skin layer and said foam material layer and said inner mold portion bearing said cushion material layer and said core material layer, and adhering together said cushion material layer and said foam material layer.

12. A method for manufacturing a resilient multi layered member according to claim 11, wherein said cushion material layer is adhered to said foam material layer by an adhesive layer.

13. A method for manufacturing a resilient multi layered member according to claim 11 or claim 12, wherein said cushion material layer is formed from urethane foam.

14. A method for manufacturing a resilient multi layered member according to claim 11 or claim 12, wherein said cushion material layer is formed from non woven fabric.

15. A method for manufacturing a resilient multi layered member according to claim 14, wherein said cushion material layer is formed from a felt material.

16. A method for manufacturing a resilient multi layered member according to claim 14, wherein said cushion material layer has a density greater than about 200 grams per square meter.

17. A method for manufacturing a resilient multi layered member according to claim 14, wherein said cushion material layer has a density between about 260 grams per square meter and about 300 grams per square meter.

18. A method for manufacturing a resilient multi layered member according to claim 11 or claim 12, wherein said cushion material layer is formed from compressed urethane material.

19. A method for manufacturing a resilient multi layered member according to claim 18, wherein said urethane material is compressed by a factor of from about 50% to about 80%.

20. A method for manufacturing a resilient multi layered member according to claim 18, wherein said cushion material layer has a density of between about 0.05 grams per cubic centimeter and about 0.10 grams per cubic centimeter.

* * * * *